United States Patent [19]
Oshima et al.

[11] Patent Number: 4,569,986
[45] Date of Patent: Feb. 11, 1986

[54] PROCESS FOR PRODUCING HALOGEN-CONTAINING UNSATURATED POLYESTER

[75] Inventors: Junji Oshima, Toyonaka; Yasuyuki Kajita; Minoru Yamada, both of Kawanishi, all of Japan

[73] Assignee: Takeda Chemical Industries, Ltd., Osaka, Japan

[21] Appl. No.: 702,904

[22] Filed: Feb. 19, 1985

[30] Foreign Application Priority Data

Feb. 29, 1984 [JP] Japan ................... 59-39490

[51] Int. Cl.$^3$ ............... C08G 63/02; C08G 63/18; C08G 63/68
[52] U.S. Cl. ................... 528/298; 528/299; 528/303; 528/306
[58] Field of Search ............... 528/298, 299, 303, 306

[56] References Cited

U.S. PATENT DOCUMENTS 4,184,035  1/1980  Goins ..................... 528/299 X
4,299,950  11/1981 Iwata et al. ............... 528/299 X
4,363,907  12/1982 Hefner et al. .............. 528/298 X
4,367,315  1/1983  Zwaenepoel et al. ......... 528/299 X

FOREIGN PATENT DOCUMENTS 0094650  11/1983  European Pat. Off. .
1195902  6/1970   United Kingdom .

Primary Examiner—Lucille M. Phynes
Attorney, Agent, or Firm—Wenderoth, Lind & Ponack

[57] ABSTRACT

A process for producing a halogen-containing unsaturated polyester which comprises halogenating a dicyclopentadiene-terminated unsaturated polyester by feeding the unsaturated polyester into a reaction system which contains halogen. The unsaturated polyester or a resin composition containing the same shows a by far improved color tone, as compared with conventional ones, and also exhibits an increased halogen content and an elevated deflection temperature. They can be advantageously used as raw materials in every industrial fields, such as electrical appliances, construction materials, automobiles, railroad wagons and airplanes.

7 Claims, No Drawings

PROCESS FOR PRODUCING HALOGEN-CONTAINING UNSATURATED POLYESTER

The present invention relates to a process for producing fire-retardant unsaturated polyesters which show an increased halogen content and also provide cured products with reduced coloration.

Unsaturated polyester resins find widespread application as raw materials for electrical appliances, construction materials, automobiles, railroad wagons, airplanes, etc. And, in recent years, the requirement for fire retardance in these raw materials has become more and more strict. In order to render unsaturated polyester resins fire-retardant, there have been proposed, for example, the method which involves polycondensation of halogenated dicarboxylic acids with polyhydric alcohols and the process which comprises post-halogenating unsaturated polyesters containing unsaturated dicarboxylic acids other than the $\alpha, \beta$-ethylenically unsaturated one, and particularly, the latter offers an economically favored method, as compared with the former.

According to the latter method, nevertheless, an increase of the halogen content with use of a large amount of unsaturated dicarboxylic acid other than the $\alpha,\beta$-ethylenically unsaturated one in order to achieve a higher degree of fire retardance results in a decrease of the concentration of the $\alpha,\beta$-ethylenically unsaturated dicarboxylic acid which act as a point of crosslinking, thus producing only cured products with a lowered deflection temperature. Also, the method which consists of the use of tetrahydrophthalic acid or its anhydride as an unsaturated dicarboxylic acid to impart fire retardance is available, but tetrahydrophthalic acid or its anhydride is a considerably high-cost raw material. Such being the case, dicyclopentadiene which serves a useful purpose of not lowering the concentration of $\alpha,\beta$-ethylenically unsaturated dicarboxylic acid but also is low in cost has recently been attracting attention as an unsaturated starting material, and a fire-retardant polyester resin formed by halogenating an unsaturated polyester based on it has been published. According to this method, the halogenation of the unsaturated polyester is conducted by adding halogen dropwise into a solution of the unsaturated polyester in an inert solvent. Actually, such resins, although they can demonstrate performance as expected in terms of fire retardance, deflection temperature, etc., show deep-brown color tone, and therefore find still extremely limited use.

The present inventors, after intensive investigation into improvement of the color tone of fire retardant unsaturated polyesters based on dicyclopentadiene, found that the use of such conditions as have never been applied for halogenation of unsaturated polyesters, namely, as opposed to the conventional method, the halogenation by feeding the said unsaturated polyester into a reaction system which contains halogen, can greatly improve the color tone of the unsaturated polyester resins, and based on the finding, have completed the present invention.

Thus, the present invention is directed toward a process for producing halogen-containing unsaturated polyesters which comprises halogenating a dicyclopentadiene-terminated unsaturated polyester by feeding the unsaturated polyester into a reaction system which contains halogen.

The dicyclopentadiene-terminated, unsaturated polyester which is to be halogenated in the present invention is obtained by the reaction among (a) dicyclopentadiene, (b) an $\alpha,\beta$-ethylenically unsaturated dicarboxylic acid or its anhydride and (c) a polyhydric alcohol, along with (d) tetrahydrophthalic acid or its anhydride, if desired, in accordance with the conventionally known method.

Dicyclopentadiene as mentioned under (a) which is used in the production of the above unsaturated polyester is highly reactive with dicarboxylic acids and polyhydric alcohols, and can yield products having carboxyl groups or alcoholic hydroxyl groups. Such reaction products contain, in the dicyclopentadiene residue, the unsaturated bond which is easily susceptible to the addition of halogen on the occasion of the halogenation to be described below. When the amount of dicyclopentadiene to be used is too large, the resulting unsaturated polyester in some instances shows a too small molecular weight, thus providing brittle cured products, and cannot be put into practical use. When the used amount of dicyclopentadiene is too small, on the other hand, there sometimes fails to result the resin with an increased halogen content which the present invention has for its object. The amount of dicyclopentadiene is in the range of about 20 to 90 mole % against the total acid component, preferably in the range of about 40 to 80 mole %.

The $\alpha,\beta$-ethylenically unsaturated dicarboxylic acid or its anhydride as mentioned under (b) includes, for example, maleic acid, maleic anhydride, fumaric acid, mesaconic acid, citraconic acid, citraconic anhydride, itaconic acid and itaconic anhydride, and maleic anhydride and fumaric acid are generally used. Because the said $\alpha,\beta$-ethylenically unsaturated dicarboxylic acid acts as a point of crosslinking in the cure of unsaturated polyester resin and is closely related with a magnitude of deflection temperature, too small amount of the dicarboxylic acid to be used in some instances fails to achieve a satisfactory deflection temperature.

The amount of the $\alpha,\beta$-ethylenically unsaturated dicarboxylic acid to be used is in the region of about 40 to 100 mole % against the total acid component, preferably in the region of about 50 to 100 mole %.

As an acid component other than the above-described ones, tetrahydrophthalic acid or its anhydride as mentioned under (d) and conventionally known aromatic dicarboxylic acids, aliphatic dicarboxylic acids having no unsaturated bond, and so forth may be simultaneously used in the present invention.

The polyhydric alcohol as mentioned under (c) which is used in the present invention includes, for example, diols, such as ethylene glycol, diethylene glycol, propylene glycol, dipropylene glycol, neopentyl glycol, 1,3-butanediol, hydrogenated bisphenol A and propylene oxide adducts of bisphenol A, and triols, such as glycerol and trimethylolpropane, but with a specific view to realizing the excellent fire resistance and high deflection temperature of cured resins at which the present invention aims, those having a low molecular weight, such as ethylene glycol are preferable. In cases in which impact resistance of cured resin, solubility of unsaturated polyester in crosslinkable monomers and solvents and so forth are required, it is quite justifiable to employ other polyhydric alcohols either solely or in combination with the above-described ones. The amount of the polyhydric alcohol to be used is not more than 120% as an equivalent against the carboxyl group in the total acid component, preferably in the range of about 100 to 110%.

The above-described (a) dicyclopentadiene, (b) α,β-ethylenically unsaturated dicarboxylic acid and (c) polyhydric alcohol, along with other dicarboxylic acid as the case may be, are allowed to undergo reaction to produce an unsaturated polyester.

This reaction is carried out in accordance with conventionally known methods, and the reaction temperature is in the range of about 100 to 220° C., while the reaction time is in the range of about 5 to 15 hours.

The above-mentioned three or four components may be allowed to react simultaneously. In such a case, it is disirable to lower the temperature in the initial stage of the reaction as much as possible to thereby suppress side reactions, such as a Diels-Alder addition reaction of dicyclopentadiene with unsaturated dicarboxylic acid. The dicarboxylic acid and/or polyhydric alcohol of about 100 to 150 mole % against dicyclopentadiene may be added and reacted in advance with dicyclopentadiene at a temperature of not higher than about 160° C., preferably about 80 to 150° C. When the reaction is carried out at 80 to 120° C., the reaction is allowed to proceed smoothly by adding a suitable amount of water in order to help the dicarboxylic acid dissolve. The latter case is preferable in that the unsaturated bond in the dicyclopentadiene residue is not impaired by the above-mentioned side reactions and can remain intact in the unsaturated polyester.

When maleic acid or maleic anhydride is used as the α,β-ethylenically unsaturated dicarboxylic acid or its anhydride, it is recommendable to increase a ratio (ratio of fumaration) of transforming the maleic acid unit in the unsaturated polyester into fumaric acid in order to produce cured products having a particularly high deflection temperature. As the conditions facilitating the transformation into fumaric acid, for example, there may be mentioned (1) an increased temperature, (2) a raised acidity of the system and (3) a lowered molecular weight of the unsaturated polyester, and so as to achieve a high ratio of fumaric transformation, it is effective to heat up to elevated temperatures in the range of about 190° C. to 210° C. in the initial stage of the reaction where the reaction product exhibits a high acid value and a low molecular weight.

In cases in which maleic anhydride, itaconic anhydride, etc. are used as the α,β-ethylenically unsaturated dicarboxylic acid, the use of an alkylene oxide (e.g., ethylene oxide, propylene oxide, butylene oxide, styrene oxide, epichlorohydrin, etc.) in place of a polyhydric alcohol can also yield unsaturated polyesters having the comparable structure.

The dicyclopentadiene-terminated unsaturated polyester thus obtained is subjected to halogenation. The conventional halogenation method comprises firstly dissolving an unsaturated polyester in a solvent which does not readily react with halogen and then adding dropwise halogen into the solution of the unsaturated polyester while it is cooled. The unsaturated polyester obtained by this method shows a deep, intense coloration.

In the present invention, halogenation is carried out by feeding the unsaturated polyester into a reaction system which contains halogen. Concretely, halogenation is conducted, for example, by the method which consists of adding little by little a solution of an unsaturated polyester in an inert solvent into a solution of halogen in an inert solvent.

Also feasible is the method which comprises feeding simultaneously a halogen solution and an unsaturated polyester solution into the reaction system, such as a line reactor, and then adding the remaining unsaturated polyester solution. The reaction temperature for halogenation is preferably not higher than about 40° C., particularly not higher than about 30° C.

The solvent which is used in the above-described halogenation includes, for example, halogenated hydrocarbons, such as methylene chloride, chloroform, carbon tetrachloride, chlorofluoromethane, ethylene dichloride and trichloroethane.

The halogenation reaction is an exothermic reaction, and because failure to control the reaction temperature at not higher than about 40° C. allows halogen to add to the α,β-ethylenically unsaturated bond as well as to reduce a number of points of crosslinking, with the result that the deflection temperature is lowered, adequate care should be required to control the reaction temperature.

As the halogen, there may be used chlorine and/or bromine, but bromine is preferred for the purpose of achieving the excellent fire retardance and elevated deflection temperature. Even if the halogenation is allowed to proceed until the consumed amount of halogen is theoretically equimolar with unsaturated bonds other than the α,β-ethylenically unsaturated bond, it does not present any problem.

After stirring is continued for a little while after introduction of the unsaturated polyester solution, addition of about 2 to 5 weight % against the halogenated unsaturated polyester of a compound capable of capturing free halogen, such as a compound having an oxirane ring, is accompanied by the disappearance of the coloration, and can permit the suppression of coloration during the step of replacing with a crosslinkable monomer or during the storage of the product.

The compound having an oxirane ring includes, for example, a variety of epoxy compounds being represented by epichlorohydrin, allyl glycidyl ether, butyl glycidyl ether, glycidyl acrylate and bisphenol-A diglycidyl ether.

The halogen-containing unsaturated polyester solution thus obtained is freed of solvent by known means such as distillation under reduced pressure to give an unsaturated polyester, in which a crosslinkable monomer may be added to the resulting unsaturated polyester to make an unsaturated polyester resin composition.

The crosslinkable monomer includes, for example, aromatic vinyl monomers, such as styrene, α-methylstyrene, chlorostyrene and vinyltoluene, and acrylic monomers, such as ethyl acrylate, butyl acrylate, methyl methacrylate and ethylene glycol dimethacrylate, and styrene is preferred. In cases in which fire retardance is particularly required, it is preferable to use chlorostyrene. The crosslinkable monomer is added to a suitable degree of viscosity, depending upon the uses of the product, but a too large amount of such crosslinkable monomer added, in some instances, deteriorates the fire retardance of the unsaturated polyester. The amount of the crosslinkable monomer to be added is suitably in the range of about 30 to 60 weight % against the halogen-containing unsaturated polyester.

The unsaturated polyester of the present invention thus obtained or a resin composition containing the same can be cured by means comparable to those for conventionally known unsaturated polyesters, and can be used in a great variety of application fields, such as paints, castings, resin concrete, patties and fiber-reinforced unsaturated polyester resins.

The unsaturated polyester as obtained in accordance with the method of the present invention or a resin composition containing the same shows a by far improved color tone, as compared with conventional ones, and also exhibits an increased halogen content and an elevated deflection temperature. Therefore, they can be advantageously used as raw materials in every industrial fields, such as electrical appliances, construction materials, automobiles, railroad wagons and airplanes.

The examples and reference examples are described in the following to illustrate the present invention more specifically.

EXAMPLE 1

(a) Synthesis of an unsaturated polyester

In a four-necked flask of a 4-l capacity equipped with a stirrer, thermometer, nitrogen-gas inlet tube and a series of partial condenser and total condenser were charged 981 g (10 moles) of maleic anhydride, 1320 g (10 moles) of dicyclopentadiene, 180 g (10 moles) of deionized water and 0.2 g of hydroquinone, and the mixture was heated until the internal temperature reached 60° C., while introducing a nitrogen gas. With the reaction heats generated by the reactions of maleic anhydride with water and then with dicyclopentadiene, the internal temperature rose to 145° C. The reaction was allowed to proceed further at 140 to 150° C. for 1 hour to give a reaction product with an acid value of 224 mgKOH/g. Subsequently, 490 g (5 moles) of maleic anhydride and 682 g (11 moles) of ethylene glycol were charged, followed by raising the temperature to 200° C. over the 2-hours period. The reaction at 195 to 200° C. for 6 hours yielded an unsaturated polyester with an acid value of 18.6 mgKOH/g and a rate of fumaric transformation ratio of 82.5%. The unsaturated polyester was cooled and dissolved in methylene chloride to form a 50 weight % solution.

(b) Halogenation of the unsaturated polyester and replacement with a crosslinkable monomer In a four-necked flask of a 3-l capacity equipped with a stirrer, dropping funnel, thermometer and air-cooler were charged 225 g of methylene chloride and 225 g of bromine, and 1000 g of the unsaturated polyester solution as mentioned under (a) was added dropwise, from a dropping funnel, to the mixture under ice-cooling. It took 1.5 hours to add dropwise the whole amount of the solution, because the internal temperature was maintained at not higher than 20° C. Stirring was continued for 30 minutes after the completion of the addition, 15 g of bisphenol-A diglycidyl ether was added as a stabilizer. The methylene chloride solution of the brominated unsaturated polyester was admixed with 290 g of styrene containing 50 ppm of hydroquinone, and freed of the methylene chloride by vacuum distillation at not higher than 60° C. to adjust the styrene content to 28%. The resulting brominated unsaturated polyester resin-styrene solution was yellowish and showed an absorbance of 0.347 at 450 mµ of wavelength.

REFERENCE EXAMPLE 1

In a four-necked flask of a 3-l capacity equipped with a stirrer, dropping funnel, thermometer and air-cooler were charged 1000 g of the unsaturated polyester-methylene chloride solution as prepared under (a) of Example 1, and 225 g of bromine was added dropwise, from a dropping funnel, to the solution under the liquid surface under ice-cooling over the 1-hour period, whereby the temperature of the reaction solution was 13 to 18° C. After the completion of the addition, stirring was continued, and 15 g of bisphenol-A diglycidyl ether was added to the reaction solution, followed by addition of 290 g of styrene containing 50 ppm of hydroquinone. The mixture was freed of the methylene chloride by vacuum distillation to adjust the styrene content to 28%. The resulting styrene solution of the brominated unsaturated polyester was darkbrown and showed an absorbance of 0.84 at 450 mµ.

EXAMPLE 2

(a) Synthesis of an unsaturated polyester

In a flask comparable to the flask used in Example 1 were charged 1740 g (15 moles) of maleic acid, 600 g of deionized water, 1320 g (10 moles) of dicyclopentadiene and 0.2 g of hydroquinone, and the mixture was heated and maintained at 80 to 90° C. for 4 hours, followed by addition of 682 g (11 moles) of ethylene glycol. The temperature was raised while distilling off water, and the reaction was allowed to proceed at 190 to 195° C. for 7 hours to give an unsaturated polyester with an acid value of 168 mgKOH/g and a rate of fumaric transformation ratio of 80.5%. The unsaturated polyester was cooled and dissolved in methylene chloride to form a 50 weight % solution.

(b) Halogenation of the unsaturated polyester and replacement with a crosslinkable monomer The methylene chloride solution of the unsaturated polyester as obtained under (a) was brominated and replaced with styrene by the same procedure as described in Example 1. The styrene solution of the brominated unsaturated polyester as obtained was pale yellowish and showed an absorbance of 0.120 at 450 mµ.

REFERENCE EXAMPLE 2

With the methylene chloride solution of the unsaturated polyester of Example 2 (a), the bromination and solvent replacement were carried out by the same procedure as described in Reference Example 1, and the resulting styrene solution of the brominated unsaturated polyester was yellowish and showed an absorbance of 0.378 at 450 mµ.

EXAMPLE 3

In a five-necked flask of a 3-l capacity equipped with a stirrer, two dropping funnels, thermometer and air-cooler were charged 225 g of methylene chloride, and 1000 g of the methylene chloride solution of the unsaturated polyester of Example 2 (a) was added dropwise to the solvent, from one of the dropping funnel, under ice cooling at a rate of about 13 g/min., while at the same time 225 g of bromine was added dropwise from the other dropping funnel at a rate of about 3 g/min. The dropwise additions were completed almost simultaneously, and the temperature of the reaction solution in the flask was maintained at not higher than 20° C. during the whole period of dropwise addition. After the completion of the dropwise additions, 15 g of bisphenol-A diglycidyl ether was added immediately to the reaction solution, and the solvent replacement was performed under reduced pressure at not higher than 60° C. to produce a styrene solution of the brominated unsaturated polyester with a styrene content of 28%.

The resulting styrene solution of the brominated unsaturated polyester was yellowish and showed an absorbance of 0.127 at 450 mµ.

What is claimed is:

1. A process for producing a halogen-containing unsaturated polyester which comprises halogenating a dicyclopentadiene-terminated unsaturated polyester by feeding the unsaturated polyester into a reaction system which contains halogen.

2. A process for producing a halogen-containing unsaturated polyester as claimed in claim 1, wherein the dicyclopentadiene-terminated unsaturated polyester is one obtained by the reaction among (a) dicyclopentadiene, (b) an α,β-ethylenically unsaturated dicarboxylic acid or its anhydride and (c) a polyhydric alcohol, and, if desired, along with (d) tetrahydrophthalic acid or its anhydride.

3. A process for producing a halogen-containing unsaturated polyester as claimed in claim 1, wherein the halogenation is conducted by adding dropwise a solution of the unsaturated polyester in an inert solvent into a solution of halogen in an inert solvent.

4. A process for producing a halogen-containing unsaturated polyester as claimed in claim 1, wherein the halogenation is conducted by feeding simultaneously a solution of halogen and a solution of the unsaturated polyester into a line reactor and then adding the remaining unsaturated polyester solution.

5. A process for producing a halogen-containing unsaturated polyester as claimed in claim 1, wherein the reaction temperature for halogenation is not higher than about 40° C.

6. A process for producing a halogen-containing unsaturated polyester as claimed in claim 1, wherein the halogen is bromine.

7. A process for producing a halogen-containing unsaturated polyester as claimed in claim 3, wherein the inert solvent is methylene chloride.

* * * * *